May 5, 1925.
J. E. JOHNSTON
REFRIGERATING APPARATUS
Filed Aug. 23, 1922
1,536,394
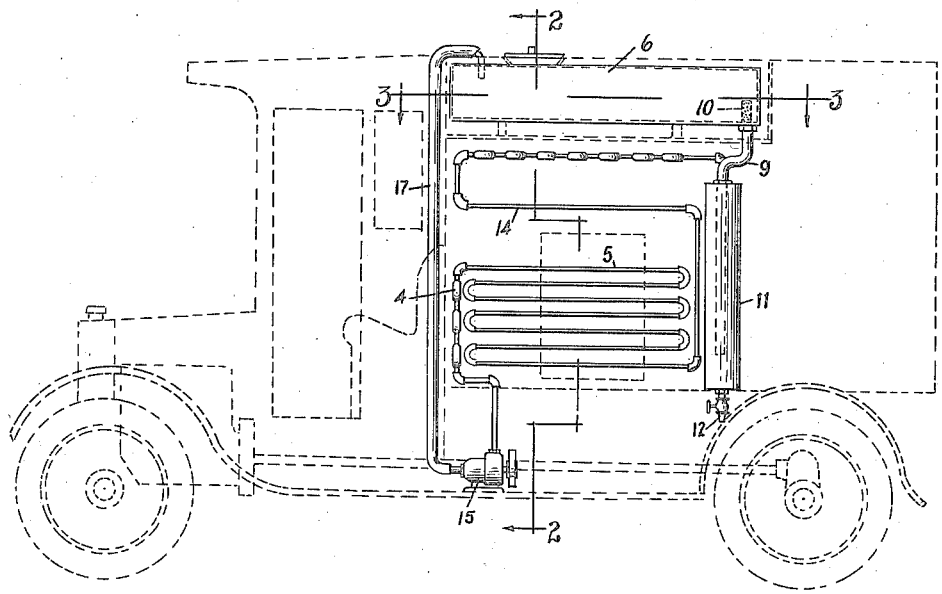
Fig. 1.
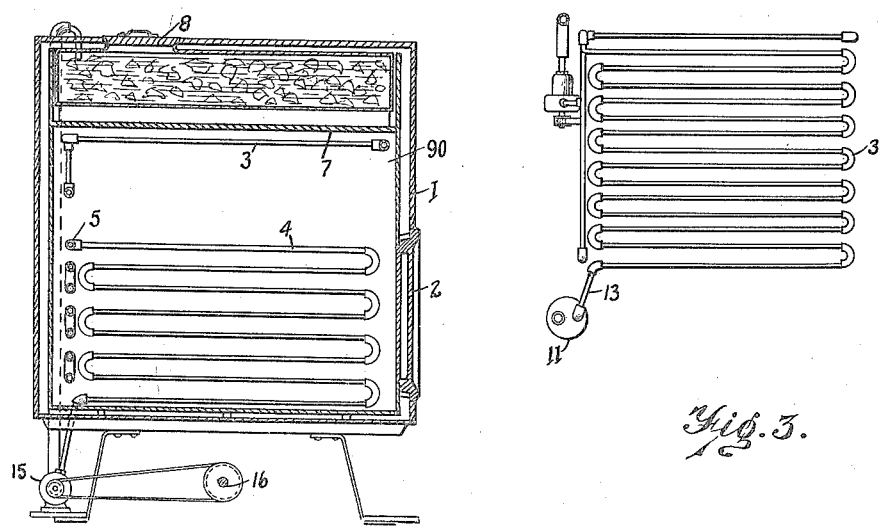
Fig. 2.
Fig. 3.
Inventor.
James E. Johnston.
By Charles E. Wiser
Attorney Patented May 5, 1925.

1,536,394

UNITED STATES PATENT OFFICE.

JAMES E. JOHNSTON, OF DETROIT, MICHIGAN, ASSIGNOR TO DETROIT CREAMERY COMPANY, OF DETROIT, MICHIGAN, A CORPORATION OF MICHIGAN.

REFRIGERATING APPARATUS.

Application filed August 23, 1922. Serial No. 583,752.

*To all whom it may concern:*

Be it known that I, JAMES E. JOHNSTON, a citizen of the United States, residing at Detroit, county of Wayne, State of Michigan, have invented a certain new and useful Improvement in Refrigerating Apparatus, and declare the following to be a full, clear, and exact description of the same, such as will enable others skilled in the art to which it pertains to make and use the same, reference being had to the accompanying drawings, which form a part of this specification.

This invention relates to refrigerating apparatus, more particularly to such apparatus adapted for use in conjunction with an automotive vehicle. Heretofore, in the transmitting of ice cream and various products by means of a motor truck, a quantity of ice is carried in the same compartment with the materials to be maintained at low temperature, but such arrangement in many cases is wasteful of ice and does not maintain ice cream, ices and other frozen confections at a sufficiently low temperature, particularly if such product is to be transported a considerable distance. I have provided an improved refrigerating apparatus including a brine circulating system hereinafter described by means of which the storage compartment is maintained continuously at the desired low temperature and by use of a minimum amount of ice, the circulation of the brine in the system being by a pump driven by the motor or other power operated part of the automotive vehicle. The features of the invention reside in the circulating sustem, the compartment for containing the ice and brine and the arrangement of the circulating system for operation in conjunction therewith. These objects and the several novel features of the invention are hereinafter more particularly described and claimed, and the preferred form of a refrigerating apparatus embodying my invention is shown in the accompanying drawings in which—

Fig. 1 is a view in dotted outline of an automotive vehicle showing in full lines my refrigerating apparatus in its relationship thereto.

Fig. 2 is a cross section on lines 2—2 of Fig. 1 showing the arrangement of the brine circulating conduits within the body of the vehicle.

Fig. 3 is a plan view of a portion of the brine circulating conduit.

In Fig. 1 I have shown a phantom view of the motor truck and it is to be understood that the vehicle body, as shown at 1 in Fig. 2, is formed with double walls providing an air space or the space between the walls may be filled with insulating material. The compartment 90 to be refrigerated may be provided with any preferred type of door as for instance as indicated at 2 in Fig. 2 and in this compartment there is a series of coils 3 at the ceiling and other series or banks of coils 4 and 5 about the side walls of the compartment. These banks of coils 4 and 5 are closely adjacent the walls of the compartment providing space between the banks of the coils for the stored product. In the preferred arrangement of the circulating system I provide a brine tank 6 above the compartment in a space provided therefor and preferably separated from the compartment 90 by a wall 7. The vehicle body is formed of a double wall as indicated in Fig. 2 and at the top an opening is provided for a removable cover 8 through which ice and brine may be introduced. Near one end of the compartment I provide an outlet conduit 9 which preferably extends upwardly into the brine tank for a distance and is provided with a screen or a series of apertures in the extension 10 of the conduit. The conduit 9 leads into a settling tank 11 preferably provided with a discharge valve 12 at the bottom. Also, leading into this tank, as will be seen in Fig. 3, is a conduit 13, and it is to be understood that this conduit extends but a short distance into the tank 11 while the conduit 9 extends downward thereinto for a considerable distance as indicated by dotted lines in Fig. 1. The conduit 13 is connected directly with the bank of coils 3 which extend in parallel loops in a horizontal plane across the ceiling of the compartment. This bank 3 is connected, by means of a conduit 14, with the bottom of the bank of coils 5 which is formed of a series of return bent portions lying in a vertical plane and the top of this coil discharges into the upper end of the bank of coils 4 which discharge to a pump 15 located in any convenient position and may be driven in any approved manner as for instance by the propeller shaft 16 of the automotive vehicle by a chain or belt or other convenient means as indicated in Fig. 2. This pump may be of any approved type and takes the liquid from the coils of the circulating system and carries it upward through a conduit 17 on the outside of the compartment discharging into the brine tank 6 at the top. The number of coils utilized may be increased or diminished over what is here shown depending upon the size of the compartment to be cooled, and additional settling tanks may be used at convenient points if desired. The main feature, however, is in the provision of the ice and brine tank above the compartment to be cooled, the tank being of a capacity to carry a considerable quantity of ice and brine. It is to be understood that salt and ice or salt solution and ice sufficient to make a strong brine solution is provided in the tank 6. When the automotive vehicle is in operation the pump is driven either by being connected with a propeller shaft as is indicated or directly with the engine as may be desired and this rapidly circulates the brine through the conduits in the storage compartment, the settling tank providing means whereby sediment is prevented from being carried into the pipes and clogging of the same. The brine tank being at the top of the compartment tends to feed the coils by gravity and the pump is utilized to return the same to the supply tank and preferably, inasmuch as the conduit 17 is on the exterior of the storage compartment, it is covered with insulation to prevent absorption of heat by the fluid in the conduit 17 while the conduits within the compartment are not insulated.

The rapid circulation of the brine by the pump, while the vehicle is in operation or the engine is operating, causes a rapid absorption of heat of the compartment maintaining the same at a low temperature. For instance in use I have found that at the time of filling the storage tank 6 with ice and brine, the temperature of the compartment may be around forty degrees F., when filled with goods. The apparatus as here shown is designed for use in transporting ice cream and frozen confections of various types and therefore a number of coils is provided presenting a large area to the air of the compartment whereby rapid absorption of heat is secured. With this apparatus starting at a temperature of forty degrees F., and operating for a period of two hours the temperature of the compartment will drop to a freezing temperature, and will be maintained at about such temperature as long as there is ice in the brine tank 6 and the engine and vehicle are in operation. With the system arranged as described, when the engine and vehicle are not in operation so that the pump is operated, the great area of conduit exposed to the air of the compartment holds its temperature for a considerable period of time. I find that, under such condition, as soon as the brine in the coils becomes warmer than the brine in the tank the colder brine in the tank flows downward into the coils thus to some extent transferring the colder liquid to the coils while the warmer liquid flows upward in the same coils to the brine tank. There is therefore two beneficial results obtained—namely, through the rapid circulation of the brine the compartment is quickly cooled and is maintained at a very low temperature during operation of the pump. Secondly, due to the arrangement of the brine supply which tends to feed the system by gravity, there is more or less continuous flow of the colder brine into the coils by gravity and tendency of the warmer brine in the coils to rise to the brine tank.

Another beneficial result is attained by the arrangement of the discharge conduit 17 at one end of the tank and the outlet 9 and 10 at the other end thereof spacing the same a considerable distance apart so that the warm brine from the conduit 17 must flow for a considerable distance through the ice and brine tank 6 before it may again pass into the conduits in the storage compartment. Further, the discharge of the brine from the conduit 17 into the tank above the level of the fluid therein tends to prevent congealing of the ice in mass form in the tank and such congealing is also to some extent prevented by movement of the vehicle over the road surface by which the tank is jarred or swayed sufficiently to keep the ice in the tank broken up.

This arrangement, while comparatively simple, is very efficient in operation, utilizing a less quantity of ice to cool the compartment than if ice were merely placed in the compartment with the goods. The unsanitary effect of the melting ice is also avoided particularly in the storage compartment and, while a quantity of ice is necessarily transported, it is used to far better advantage and the expense of the structure is more than compensated for by the increased effectiveness of the ice employed and greater reduction in temperature in the storage compartment over that secured by direct icing. It is further to be understood that my apparatus may be utilized in stationary installations without departing from the spirit of my invention as set forth in the appended claims.

What I claim is—

1. In a refrigerating apparatus, the combination with a storage compartment having heat insulated walls, of a second compartment thereabove having heat insulated walls separated from the first compartment, an ice and brine supply receptacle in the second compartment, a settling tank in the storage compartment into which brine may flow by gravity from the supply receptacle, a series of coils in the storage compartment connected with the top of the settling tank, a power operated pump connected with the coils tending to withdraw brine therefrom, and a discharge conduit for the pump discharging brine into the supply receptacle.

2. A portable refrigerating apparatus comprising the combination with a vehicle having a power plant and a storage compartment having heat insulated walls, of a second compartment thereabove having heat insulated walls and separated from the first compartment, the said second compartment being provided with means to hold a supply of ice and brine, a settling tank in the storage compartment into which brine may flow by gravity from the brine tank of the second compartment, a series of coils in the storage compartment connected with the top of the settling tank, a pump operatively connected with the power plant and connected with the coils tending on operation to withdraw brine therefrom, and a discharge conduit for the pump discharging brine into the supply receptacle.

In testimony whereof, I sign this specification.

JAMES E. JOHNSTON.